April 15, 1941.  J. H. NIECKELS  2,238,183
REMOTE CONTROL APPARATUS
Filed April 12, 1939    2 Sheets-Sheet 1
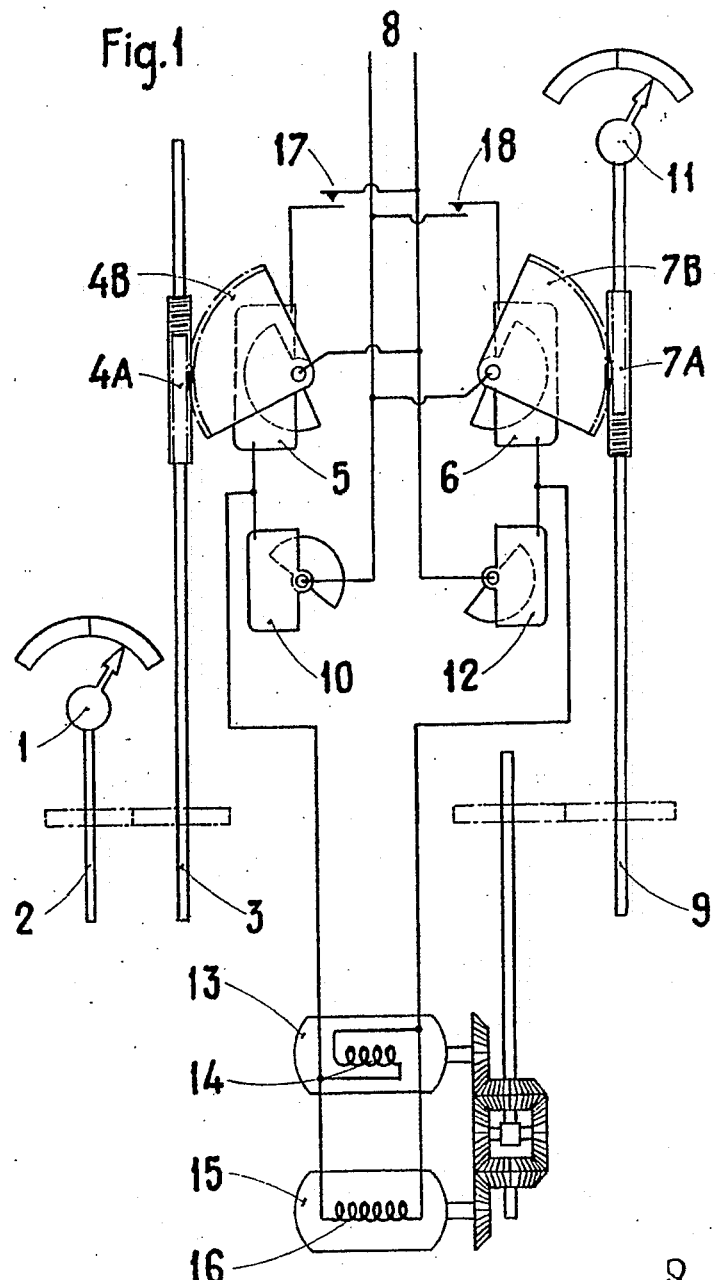

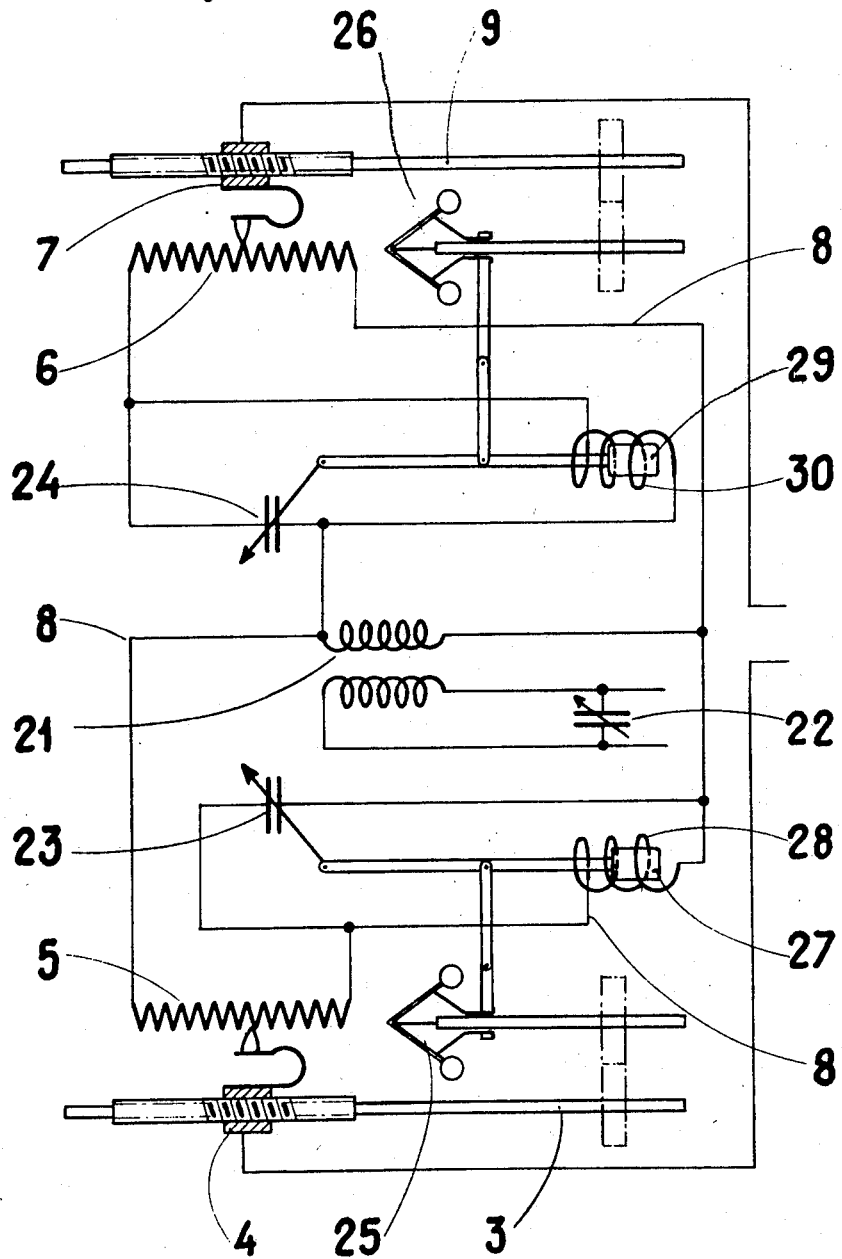

Patented Apr. 15, 1941

2,238,183

UNITED STATES PATENT OFFICE 2,238,183

REMOTE CONTROL APPARATUS

John Harry Nieckels, Stockholm, Sweden

Application April 12, 1939, Serial No. 267,509
In Sweden April 14, 1938

13 Claims. (Cl. 172—239)

This invention relates to an apparatus for the control at a distance of states of motion of an object, i. e. its position as a function of time, velocity and acceleration, or one or more of these factors dependent upon the nature of the motion, from a transmitting device placed at a great or small distance.

The apparatus hitherto known for the control at a distance of the state of motion of an object have been found neither to be capable of working with sufficient accuracy nor to possess the power required in many cases, for instance for controlling heavy objects. The insufficient accuracy has then resulted partly in a certain error in the desired correspondence between the position of the control member of the transmitter and that of the controlled member of the receiver, and partly in a certain time-lag (phase difference) before the desired correspondence between their positions is attained, or in both these demerits. Another deficiency of some of the apparatus hitherto known is the so-called hunting-effect, which consists in that the controlled member of the receiver does not sufficiently quickly reach the position of balance indicated by the control member of the transmitter but makes oscillations about this position which cannot be damped out sufficiently fast to obtain the desired accuracy under all circumstances.

If, for simplicity, the controlling and controlled members are supposed to be replaced by masses concentrated at points, each moving in its own co-ordinate system, and if the variables referring to the co-ordinate system of the controlling member are indicated by small letters and those referring to the system of the controlled member by capital letters, the ideal solution of the problem of the control at a distance requires that at each moment the displacement $$s - s_0 = K(S - S_0) \quad (1)$$

the velocity $$v - v_0 = L(V - V_0) \quad (2)$$

and the acceleration $$a - a_0 = M(A - A_0) \quad (3)$$

where K, L and M are constants, and further that when the time=0

$$\begin{cases} s = s_o \\ v = v_o \\ a = a_o \end{cases} \text{ and } \begin{cases} S = S_o \\ V = V_o \\ A = A_o \end{cases}$$

where the quantities indicated by the suffix "o" relate to the freely chosen starting positions. It should be noted that $s$ and $S$ may be three dimensional quantities and that the Equation 1 thus implies that the two mass points each in its co-ordinate system synchronously describe similar curves, where the scale is indicated by K, and that in the same manner the vectors of the velocity and acceleration vary similarly in the scales L and M, respectively.

Supposing now the two mass points to be moving each by itself without being connected to each other by any transmission system tending to co-ordinate their movements, then during a certain elementary interval $$s - s_0 - K(S - S_0) = \Delta s \quad (4)$$
$$v - v_0 - L(V - V_0) = \Delta v \quad (5)$$
$$a - a_0 - M(A - A_0) = \Delta a \quad (6)$$

From this it is evident that the construction of the transmission system ought to be such as to tend perpetually to reduce the values of $\Delta s$, $\Delta v$ and $\Delta a$ to zero and to retain them at this value.

The present invention relates to apparatus in which the variations of $\Delta s$, $\Delta v$ and $\Delta a$ or their components along the axes of a co-ordinate system together or each by itself cause a potential difference between two points in an electric circuit which thereafter, if desired by the aid of an amplifier, is used for influencing motors or the like moving the controlled member in the directions of the axes of the co-ordinate system or causing it to rotate, and wherein this action may take place either directly or by means of the controlling device of the motor employed, for example field-rheostats, distributing slide-valves, carburettor throttles or the like. The sole point where the value of $\Delta s$ is zero may in that case correspond to the potential-difference zero or another value chosen in advance.

If the three voltages which are in this way caused to correspond to the variations of $s$, $v$ and $a$ are connected in series, a resulting electromotive force E is obtained $$E = \Delta s + \Delta v + \Delta a = E_1 - E_2 \quad (7)$$

where $$E_1 = s + \frac{ds}{dt} + \frac{d^2s}{dt^2} \quad (8)$$

and $$E_2 = KS + L\frac{dS}{dt} + M\frac{d^2S}{dt^2} \quad (9)$$

or for $$E = 0 \quad s + \frac{ds}{dt} + \frac{d^2s}{dt^2} = KS + L\frac{dS}{dt} + M\frac{d^2S}{dt^2} \quad (10)$$

whence it follows that the movements will then be fully identical, uniform and synchronous.

In order to create a potential difference of a suitable form a zero-method may, for instance, be used in which the electric characteristics of different branches of an electric circuit, such as capacitances, inductances and ohmic resistances are cut in or out or are varied in any other way by means of members connected with the controlling and controlled members, in such a manner that a relation fixed in advance between the potentials at two points in the circuit arises, for instance identity between the voltage vectors, when these are, thus, identical in magnitude as well as in phase and, perhaps, also in frequency.

In the accompanying drawings there is shown diagrammatically in Figure 1 an apparatus according to the invention with a circuit containing condensers, in which as an example only the difference between one of the quantities characterising the states of motion of the controlling and controlled members has been chosen for representation as an impulse voltage, viz. the positions. In Figure 2 there is shown diagrammatically another embodiment of the invention in which the difference in value of all the three characteristics of the states of motion of the controlling and controlled members are composed to form an impulse voltage according to the Equation 7.

In Figure 1, 1 indicates the controlling member the shaft 2 of which, if desired by the aid of a gearing not shown, turns a shaft 3 or the like on which is fixed a worm 4a or the like meshing with a worm-wheel sector 4b fixed on the same shaft as or connected in another way with the movable plate system of a variable condenser 5. The movable plate system of a second variable condenser 6, which is in the same way connected with a shaft 9 pertaining to the controlled member 11 by a worm-wheel sector 7b and a worm 7a, rotates or is moved in another way when the shaft 9 rotates. Two other condensers 10 and 12, 10 for the controlling member and 12 for the controlled member, are connected, together with the condensers 5 and 6, each in its arm of a Wheatstone bridge network on which a voltage V is impressed through the conductors 8. To each angle of turning of the shafts 3 and 9 in relation to each other and thereby also of the controlling member 1 and the controlled member 11 relatively to each other corresponds then a certain potential difference $V_1$ or phase-difference between the voltages in the fixed plates of the condensers 5 and 6. It is possible in known manner to use this fact in such a way that the shaft 9 is brought to a standstill either when the potential difference $V_1$ is zero or when the voltages in the fixed plates of the two condensers are in phase, or when the potential difference or the phase-difference attains a certain positive or negative value fixed in advance, but with the apparatus constructed in such a manner that this takes place in one and only one mutual position of the movable plate systems in the condensers 5 and 6 and thereby also of the shafts 3 and 9 relatively to each other.

The potential difference $V_1$ is in the example shown, if desired with the aid of an amplifier, employed for influencing the field flux in two motors 13 and 15 which are, as the Figure 1 shows, connected by a differential gear and provided with two additional windings 14 and 16 wound in opposite directions through which the current arising flows. When $V_1$ and thus the current strength in the additional field-windings is zero the motors 13 and 15 rotate in opposite directions and at exactly the same speed, and therefore the shaft 11 of the controlled member, which if desired may be connected with the shaft 9 and the worm-wheel sector 7b by means other than a mechanical connection, then remains stationary. If, however, $V_1$ or the phase-difference between the voltages on the fixed plates in the condensers 5 and 6 differs from zero, the shaft 9 and thereby the controlled member 11 itself will rotate in one or the other direction, dependent upon the sign of the phase-difference in relation to the starting point chosen. The additional windings 14 and 16 of the motors 13 and 15 should then be suitably dimensioned so as to cause different field-strengths for the same strength of current. When the state of motion of the controlled member 11 approaches or leaves the state of motion of the controlling member 1 the capacitance of the condenser 6 also approaches or leaves respectively the value corresponding to that of the regulated capacitance of the condenser 5.

Instead of the electric differentially connected motors of the above described kind other motors or driving arrangements may, naturally, be used for adjusting or controlling the state of motion of the controlled member.

In order to make it possible to disengage the driving arrangement for moving the controlled member in response to the movements of the controlling member, for instance to make it possible to transfer the controlled member quickly to the proximity of a desired position from another distant position, there are provided in the circuit in the example according to Figure 1 two short-circuiting devices 17 and 18 by which the condensers 5 and 6 can be short-circuited. Suitably the apparatus according to Figure 2 may also be provided with arrangements of another kind by means of which the condensers, the inductance-coils and the resistances or any of them can be short-circuited for the same purpose.

Figure 2 shows an apparatus according to the invention in which there are used in a circuit 8, connected in the form of a Wheatstone bridge network and fed with a voltage V by a transformer 21 from a circuit the frequency of which can be varied by means of a variable condenser 22, both resistances and inductances and capacitances for controlling the position, the acceleration and the velocity, respectively, of the controlled member in relation to the controlling member. The bridge circuit 8 includes two potentiometers 5 and 6 over which the contacts 4 and 7 move. These contact arrangements determine the position of the shafts 3 and 9 of the controlling and controlled members. The variable condensers 23 and 24 are connected by means of levers or in another way with the centrifugal regulators 25 and 26 which are driven from the shafts 3 and 9, respectively. When the weights of the centrifugal regulators move outwards or inwards the capacitances of the condensers 23 and 24 will vary in proportion to these movements by the movable plate systems of the variable condensers then being turned. Simultaneously the iron cores 27 and 29 in the inductance coils 28 and 30 will move axially with a velocity that is a function of the rate of change of the velocity, i. e. the acceleration of the shafts 3 and 9, respectively. A voltage is thus generated in each branch of the bridge which will be superposed on the alternating current voltage before existing. Between the contact points 4 and 7 a voltage will thus arise which is the sum of these voltages.

The alternating voltage in turn is the geometric sum of a real part dependent upon the positions of the contacts 4 and 7 on the potentiometers 5 and 6 and an imaginary part dependent upon the capacitances of the condensers 23 and 24, respectively, which in turn are connected with the speeds of the shafts 3 and 9. Thus the voltage $V_1$ between the contacts will be identical with the disturbance function E defined in the above-mentioned Equation 7. By varying the frequency of the impressed voltage V by means of the condenser 22 it is possible to arrange, if desired, that at a certain given relation between the states of motion of the controlling and controlled members resonance will arise in the circuit 8 and thereby inter alia a more delicate adjustment will be obtained.

The invention is not limited to the apparatus above described or shown in the drawings, which are only cited and shown by way of example and may be varied in many ways in details and construction without exceeding the scope of the invention.

What I claim as new and desire to secure by Letters Patent of the United States of America is:

1. Apparatus for the remote control of the position of a secondary element in accordance with displacements of a primary element, said apparatus being of the type including a balanced electrical network having a branch containing impedance adjustable by said primary element, a second branch containing impedance adjustable by said secondary element, an input circuit for impressing an alternating current voltage upon the network, an output circuit in which a potential is developed when the workwork is unbalanced, and motor means controlled by potentials developed in the output circuit to adjust said secondary element to re-establish a balance of the network, characterized by the fact that the impedances of said branches are complex and each includes adjustable impedances of different characters, and said primary and secondary elements are connected to the adjustable impedances of different characters to vary the same in accordance with difference functions of the displacements of the respective elements.

2. Apparatus as claimed in claim 1, wherein each of said complex impedances includes a resistive and a reactive impedance component, one of said impedance components being adjusted in accordance with the position of the associated element and the other impedance component being adjusted in accordance with a function of the motion of the associated element.

3. Apparatus as claimed in claim 1, wherein each of said complex impedances includes a resistive and a reactive impedance component, one of said impedance components being adjusted in accordance with the position of the associated element and the other impedance component being adjusted in accordance with the velocity of the associated element.

4. An apparatus for the remote control of the position of a secondary element in accordance with the state of motion of a primary element, said apparatus comprising an electrical network having a pair of balancing branches, an input circuit for imposing an alternating current voltage upon said network, an output circuit in which a potential is developed when said network is unbalanced, each balancing branch including variable impedances of different types, means for adjusting the impedances of different type in one balancing branch by said primary element in accordance with different functions of the motion of that element, means for adjusting the impedances of different type in the other balancing branch by said secondary element in accordance with different functions of the motion of that element, and motor means in said output circuit for displacing said secondary element in response to voltages developed in said output circuit by an unbalance of the network, thereby to re-establish a balance of the network.

5. An apparatus as claimed in claim 4, wherein each of said balancing branches includes reactive impedances of different types, and means is provided for adjusting the frequency of the imposed alternating current voltage to resonate with said balancing branches of the network at a preselected adjustment of the relative values of the reactive impedances of the branches.

6. An apparatus as claimed in claim 4, wherein the variable impedances of said balancing branches include resistive and capacitive components.

7. An apparatus as claimed in claim 4, wherein the variable impedances of said balancing branches include resistive and inductive components.

8. An apparatus as claimed in claim 4, wherein the variable impedances of said balancing branches include resistive, capacitive and inductive components.

9. An apparatus as claimed in claim 4, wherein the variable impedances of said balancing branches include a resistance, and an inductance shunted by a capacity.

10. An apparatus for the control of the position of a secondary element in accordance with position and state of motion of a primary element, said apparatus comprising a Wheatstone bridge network having as the conjugate arms thereof an input circuit for imposing an alternating current voltage upon the bridge and an output circuit in which the alternating current potential varies with the unbalance of the bridge, and motor means in said output circuit for displacing said secondary element; opposed balancing arms of the bridge comprising resistances adjustable respectively by said primary and said secondary elements, and the other pair of opposed balancing arms of the bridge comprising reactive impedance adjustable respectively by said primary and secondary elements.

11. An apparatus for the control of the position of a secondary element in accordance with position and state of motion of a primary element, said apparatus comprising a Wheatstone bridge network having as the conjugate arms thereof an input circuit for imposing an alternating current voltage upon the bridge and an output circuit in which the alternating current potential varies with the unbalance of the bridge, and motor means in said output circuit for displacing said secondary element; opposed balancing arms of the bridge comprising resistances adjustable respectively by said primary and said secondary elements in accordance with the positions of those elements, and the other pair of opposed balancing arms of the bridge comprising reactive impedance adjustable respectively by said primary and secondary elements in accordance with a function of the state of motion of those elements.

12. An apparatus for the control of the position of a secondary element in accordance with position and state of motion of a primary element, said apparatus comprising a Wheatstone bridge network having as the conjugate arms thereof an input circuit for imposing an alternating current voltage upon the bridge and an output circuit in which the alternating current potential varies with the unbalance of the bridge, and motor means in said output circuit for displacing said secondary element; opposed balancing arms of the bridge comprising resistances adjustable respectively by said primary and said secondary elements, and the other pair of opposed balancing arms of the bridge comprising reactive impedances of opposite type adjustable respectively by said primary and secondary elements in accordance with the velocity and the acceleration of those elements.

13. In remote control apparatus, the combination with a primary element, a secondary element, and sets of indicating members connected to the respective elements for displacement thereby to indicate the instantaneous values of the positions, velocities and accelerations of the respective elements, of an electrical network having balancing branches connected between an alternating current input circuit and an alternating current output circuit, pairs of adjustable impedances of three types in said balancing branches, the impedance pair of each type being in different branches, whereby the network may be balanced to provide zero current in the output circuit, means for adjusting one impedance of each type by the respective indicating members of the set connected to the primary element, means for adjusting the other impedances by the respective indicating members of the set connected to the secondary element, and motor means energizd by current flow in said output circuit to displace said secondary element.

JOHN HARRY NIECKELS.

CERTIFICATE OF CORRECTION.

Patent No. 2,238,183. April 15, 1941.

JOHN HARRY NIECKELS.

It is hereby certified that error appears in the printed specification of the above numbered patent requiring correction as follows: Page 3, first column, line 47, claim 1, for the word "difference" read --different--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.